(12) United States Patent
Kleber et al.

(10) Patent No.: US 7,770,955 B2
(45) Date of Patent: Aug. 10, 2010

(54) AUTOMOTIVE CLOSURE PANEL ASSEMBLY

(75) Inventors: Richard M. Kleber, Clarkston, MI (US); John E. Carsley, Clinton Township, MI (US); Gary R. Pelowski, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 117 days.

(21) Appl. No.: 12/110,741

(22) Filed: Apr. 28, 2008

(65) Prior Publication Data

US 2009/0230728 A1    Sep. 17, 2009

Related U.S. Application Data

(60) Provisional application No. 61/036,493, filed on Mar. 14, 2008.

(51) Int. Cl.
*B21D 39/02* (2006.01)
*B60J 7/00* (2006.01)

(52) U.S. Cl. .................. 296/29; 296/191; 296/193.11; 29/513; 29/243.58

(58) Field of Classification Search .................. 296/29, 296/191, 146.5, 76, 193.11; 29/513, 243.58, 29/509
See application file for complete search history.

(56) References Cited

U.S. PATENT DOCUMENTS

| 3,680,910 | A | * | 8/1972 | Stanner ...................... 296/29 |
| 4,916,284 | A | * | 4/1990 | Petrick .................. 219/121.64 |
| 5,237,734 | A | * | 8/1993 | Polon .......................... 29/513 |
| 5,451,742 | A | | 9/1995 | Nishin et al. |
| 6,927,370 | B2 | | 8/2005 | McClure et al. |
| 7,115,322 | B2 | * | 10/2006 | Curtiss et al. ............... 428/582 |
| 7,215,067 | B2 | | 10/2006 | Bonnet et al. |
| 7,290,423 | B2 | | 11/2007 | Carsley et al. |
| 2005/0284204 | A1 | | 12/2005 | Carsley et al. |
| 2007/0186608 | A1 | | 8/2007 | Miller et al. |

* cited by examiner

*Primary Examiner*—Joseph D Pape
(74) *Attorney, Agent, or Firm*—Reising Ethington P.C.

(57) ABSTRACT

An automotive closure panel assembly may include an inner panel and an outer panel. The outer panel may have a flange that protrudes from a body of the outer panel. The outer panel may also have more than one tabs that are each spaced along the flange and that each extend away from the flange. Each of the tabs may be folded over the inner panel during a hemming process.

17 Claims, 2 Drawing Sheets

AUTOMOTIVE CLOSURE PANEL ASSEMBLY

CROSS-REFERENCE TO RELATED APPLICATIONS

This application claims the benefit of U.S. Provisional Application No. 61/036,493, filed Mar. 14, 2008.

TECHNICAL FIELD

The field to which the disclosure generally relates includes products and methods including an automotive closure panel assembly having an inner panel and an outer panel that are hemmed together.

BACKGROUND

Automotive closure panel assemblies can sometimes have an inner panel and an outer panel that are held together after a hemming process where an edge of the outer panel is typically folded over an edge of the inner panel. But sometimes the hemming process can warp (e.g., cracks, wrinkles, etc.) an exposed surface of the outer panel. This can also occur on outer panels composed of magnesium or of a magnesium alloy.

SUMMARY OF EXEMPLARY EMBODIMENTS OF THE INVENTION

One embodiment of the invention may include a product which may include an automotive closure panel assembly. The automotive closure panel assembly may include an inner panel and an outer panel. The outer panel may have a flange that protrudes from a body of the outer panel. The outer panel may also have more than one tabs that are each spaced along the flange and that each extend away from the flange. Each of the tabs may be folded over the inner panel during a hemming process.

One embodiment of the invention may include a product which may include an outer panel that is part of an automotive closure panel assembly. The outer panel may have more than one tabs that are each spaced along an edge of the outer panel, and that each extend away from the edge. Each of the tabs may be folded over an inner panel (that is also part of the automotive closure panel assembly) during a hemming process.

One embodiment of the invention may include a method of making a product which may include providing an inner panel and an outer panel that are part of an automotive closure panel assembly. The outer panel may be composed of a magnesium material or a magnesium alloy material. The outer panel may have a flange that protrudes from a body of the outer panel, and the outer panel may have more than one tabs that are each spaced along the flange and that each extend away from the flange. The method may also include folding each of the tabs over the inner panel of the automotive closure panel assembly.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

The figures illustrate an embodiment of a panel assembly such as an automotive closure panel assembly 10. The subject matter shown and described may be applied to different automotive closure panel assemblies including a hood, a door, a hatch, and the like. The automotive closure panel assembly 10 may include an outer panel 12 and an inner panel 14 that are held together after a hemming process. The automotive closure panel assembly 10 may be designed so that the hemming process does not cause visible warping on an outer surface, or "show surface," of the outer panel 12 as may occur when the outer panel is composed of magnesium or a magnesium alloy. The automotive closure panel assembly 10 may also be suited for high volume part manufacturing production as is common in the automotive industry.

Figure 2:
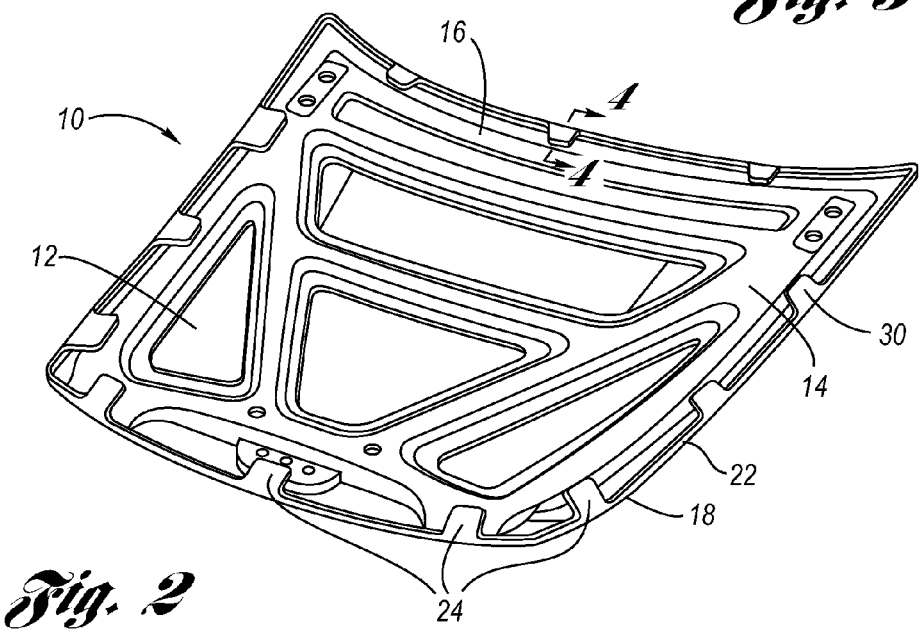
FIG. 2 is a perspective view of the outer panel of FIG. 1 hemmed together with an inner panel.

The outer and inner panels 12, 14 may be initially formed by various metal processes such as hot forming or hot gas forming like superplastic forming (SPF) or quick plastic forming (QPF). In one example, metal sheets are cut, surfaces are treated, and 3-dimensional contours are formed by drawing or stamping. In some cases, the inner panel 14 may have a more complex configuration than the outer panel 12, and may serve to reinforce the outer panel. Referring to FIG. 2, the inner panel 14 may have an outer surface 16 that is exposed in the automotive closure panel assembly 10.

The outer panel 12 may constitute the more readily visible panel of the automotive closure panel assembly 10 when installed in an automobile. For example, its show surface may be the exterior of a vehicle hood. The outer panel 12 may be composed of steel, steel alloys, aluminum, aluminum alloys, magnesium, or magnesium alloys; the outer panel may also be composed of dissimilar materials. When the outer panel 12 is composed of magnesium or magnesium alloys, the outer panel may be difficult to bend (especially at non-elevated temperatures) and the outer panel may be thicker, when compared to outer panels of other materials.

Figure 1:
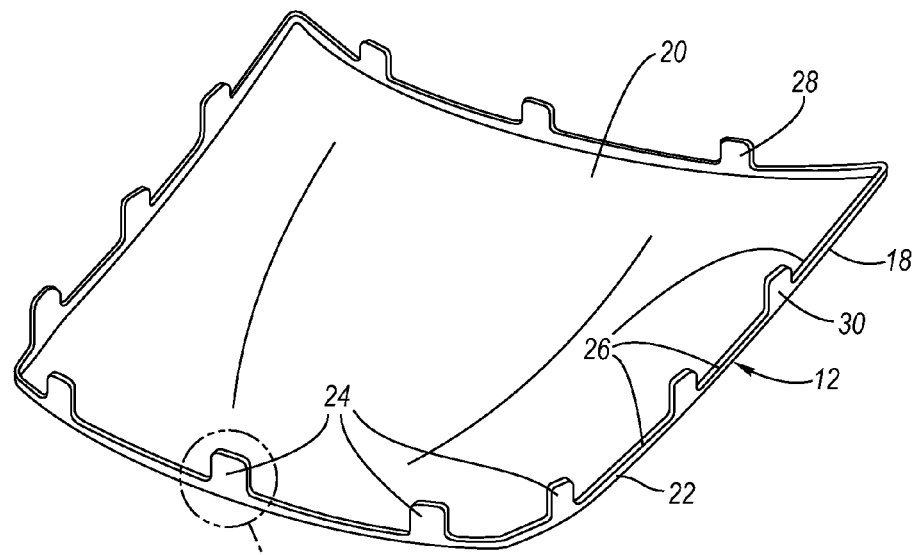
FIG. 1 is a perspective view of an outer panel of an automotive closure panel assembly.

Referring to FIG. 1, an edge 18 may bound a body 20 of the outer panel 12 to define a perimeter of the outer panel. A flange 22 may protrude perpendicularly from the body 20, and may extend continuously around the body from the edge 18 to form a peripheral rim in the outer panel 12. The flange 22 may be unitary with the body 20. In one example, the flange 22 may be constructed by securing the outer panel 12 between an upper and lower die with a terminal overhang exposed out of the dies. A tool may then be actuated in a direction that forms a 90° angle (or other angle) with respect to the terminal overhang to thus bend the overhang at the 90° angle. Other processes may be used to construct the flange 22; for example, the flange forming process may be integral with, or a part of, the outer panel forming process.

Figure 3:
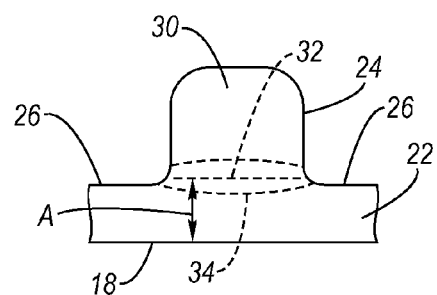
FIG. 3 is a close-up of a tab of the outer panel of FIG. 1.

Numerous tabs 24 may be provided with the outer panel 12 to be used in a hemming process between the outer and inner panels. Referring to FIGS. 1 and 3, in different forms the tabs 24 may be an appendage or extension that is unitary with, and that depends from, the flange 22. The tabs 24 may be spaced along the flange 22 away from each other and isolated by elongated recesses 26. The exact shape, size, and dimensions of each tab 24 may be dictated by, among other things, the shape, size, and dimensions of the outer panel 12 and the inner panel 14, the desired holding strength between the outer panel and the inner panel, and the material used for the outer panel. The tabs 24 may be constructed concurrently with the flange 22, or may be cut out of an existing flange in a subsequent process. Each tab 24 may have an inboard surface 28 and an opposing outboard surface 30. In other embodiments not shown, the tabs 24 may extend directly from the edge 18 and may be unitary with the body 20, where the flange 22 is not present.

A hem line 32 may be defined on each tab 24 near an interface of the particular tab and the flange 22. The hem line 32 may constitute the bend or break line of the hemming process about which the tab 24 is folded. Referring to FIG. 3, the hem line 32 may extend completely across the tab 24 and vertically above the edge 18 by a distance A. The distance A may be a distance that is sufficient to dissipate any deformation that may occur at the hem line 32 due to the hemming process. In other embodiments, the hem line 32 may also be located vertically above the interface of the tab 24 and the flange 22. A heat region 34 may be defined at and around each hem line 32, and may constitute the area targeted for heating during the hemming process.

In one example hemming process, only the tabs 24 may be hemmed and folded to limit, or altogether prevent, the show surface of the outer panel 12 from warping or otherwise being visibly affected. In other words, the flange 22 may be substantially isolated from, or remote of, the bending that occurs about the hem line 32 during the hemming process; and the flange itself may not be bent and left substantially unchanged, or may be only slightly bent. Also, if there is indeed deformation caused by the bending, it may only occur near the location of the spaced tabs 24, as opposed to occurring all along the edge 18 as may be the case where an entire and more extended flange is bent and not just the tabs.

In one example hemming process, the hem line 32 may be heated at the heat region 34 before each tab 24 is bent. In some cases, this facilitates bending while reducing deformations. For example, a tab 24 composed of magnesium or a magnesium alloy may be more easily bent and may produce a more unblemished surface when bent at an elevated temperature (e.g., 270° C.) as compared to a tab that is bent at an unelevated temperature. The temperature of the heat region 34 may be elevated rapidly and locally by a focused and concentrated heat such as by a laser (e.g., YAG, diode, $CO_2$, etc.) an induction coil, and the like. In these examples, the elevated temperature may be substantially isolated within the heat region 34.

Figure 4:
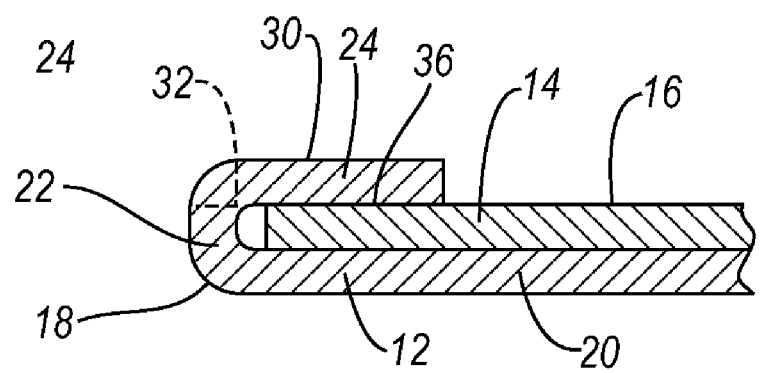
FIG. 4 is a cross-section taken along line 4-4 in FIG. 2.

In one example hemming process, the tabs 24 may be folded over the inner panel 14 to anchor the outer panel 12 and the inner panel together and thus assemble the automotive closure panel assembly 10. Referring to FIG. 4, the inboard surface 28 and the outer surface 16 may contact each other and form an attachment area 36 at an interface therebetween. The attachment area 36 may then be welded, soldered, adhered, glued, sealed, bolted, riveted, or otherwise attached to provide an added joint between the tab 24 and the inner panel 14 in order to produce a seal for structural integrity, and against dirt, moisture, and the like from seeping therebetween.

Examples of hemming processes that may be used to hem the tabs 24 may be roller hemming methods having a robotic roller apparatus. The robotic roller apparatus may have two or more sequential rollers that perform progressive hemming where a first roller may prehem the tabs from a 90° open position to about a 45° open position, and where a second roller then may flatten the tab to a closed position. In one example, a laser apparatus may be equipped to the robotic roller apparatus so that the laser apparatus can heat the heat regions 34 before the tabs 24 are hemmed. In another example, an induction coil apparatus may be equipped to the robotic roller apparatus so that the induction coil apparatus can heat the heat region 34 before the tabs 24 are hemmed. In another example, friction heating may be used to heat the heat region 34 before the tabs 24 are hemmed. Here, a friction roller may be equipped to the robotic roller apparatus and may be rotated by an electric motor. The friction roller may be contacted to the heat region 34 before the first roller prehems the tabs 24. In other examples, the laser apparatus, the induction coil apparatus, or the friction roller may be equipped to a hemming press or a hemming die in order to heat the heat region 34 before the tabs 24 are hemmed. In other embodiments, the laser apparatus, the induction coil apparatus, or the friction roller may be equipped to a table top hemming machine in order to perform a table top hemming method.

Figure 5:
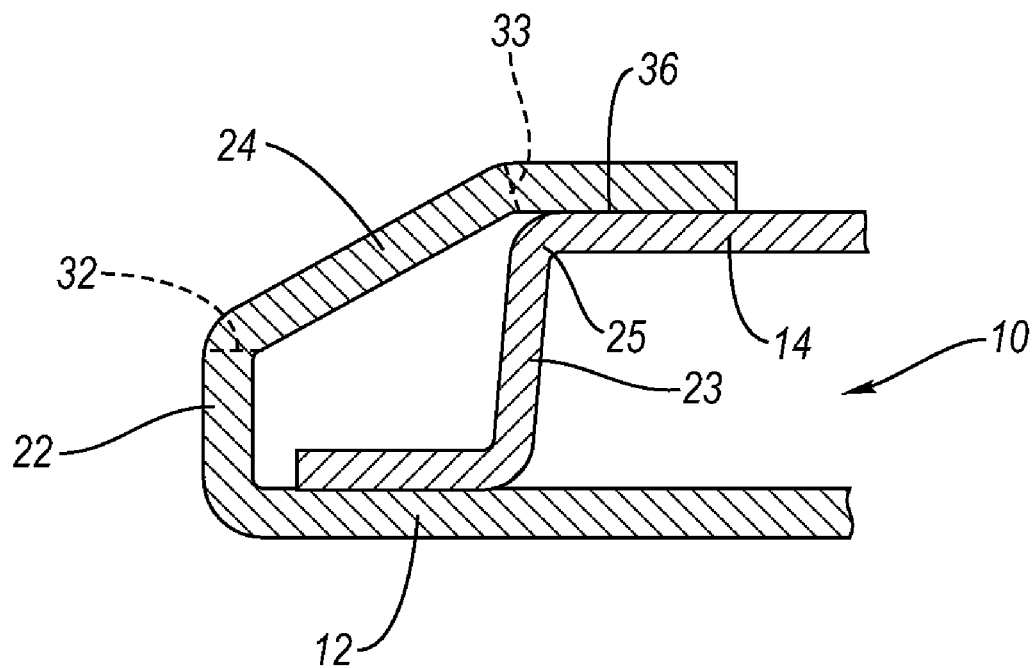
FIG. 5 is a cross-section of an embodiment of an automotive closure panel assembly.

Referring to FIG. 5, another embodiment of the automotive closure panel assembly 10 is shown. Here, the inner panel 14 may have a flange 23 with one or more bends 25 formed in its shape. Each tab 24 of the outer panel 12 may have a second hem line 33 that is similar to the hem line 32 previously described. Each tab 24 is thus bent at both the hem line 32 and the second hem line 33 in order to accommodate the flange 23. A heat region (not marked) may also be defined at and around each of the second hem lines 33.

The above description of embodiments of the invention is merely exemplary in nature and, thus, variations thereof are not to be regarded as a departure from the spirit and scope of the invention.

What is claimed is:

1. A product comprising:
    an automotive closure panel assembly comprising:
        an inner panel; and
        an outer panel having a flange protruding from a body of the outer panel, the outer panel also having a plurality of tabs spaced along the flange and extending away from the flange, each of the plurality of tabs being folded over the inner panel during a hemming process, wherein only the plurality of tabs are folded and the flange is not folded during the hemming process.

2. A product as set forth in claim 1 wherein the outer panel is composed of magnesium or a magnesium alloy.

3. A product as set forth in claim 1 further comprising a recess defined between each successive tab of the plurality of tabs, the recesses separating each successive tab.

4. A product as set forth in claim 1 wherein each of the plurality of tabs is a unitary extension of the flange, and the flange is unitary with the body of the outer panel.

5. A product as set forth in claim 1 further comprising a hem line located on each of the plurality of tabs, about which each of the plurality of tabs are folded during the hemming process.

6. A product as set forth in claim 5 further comprising a heat region located adjacent each hem line such that each hem line is heated to an elevated temperature as compared to other portions of each of the plurality of tabs and as compared to other portions of the flange, each hem line being heated before each of the plurality of tabs is folded over the inner panel during the hemming process.

7. A product as set forth in claim 1 wherein, when hemmed, an inboard surface of each of the plurality of tabs contacts an outer surface of the inner panel to define an attachment area thereat about which the plurality of tabs and the inner panel are joined.

8. A product comprising:
an outer panel of an automotive closure panel assembly, the outer panel having a flange protruding from a body of the outer panel, the outer panel also having a plurality of tabs spaced along the flange of the outer panel and extending away from the flange, each of the plurality of tabs being folded over an inner panel of the automotive closure panel assembly during a hemming process, wherein only the plurality of tabs are folded and the flange is not folded during the hemming process.

9. A product as set forth in claim 8 further comprising a flange protruding from a body of the outer panel, wherein the plurality of tabs extend away from the flange.

10. A product as set forth in claim 8 wherein the outer panel is composed of magnesium or a magnesium alloy.

11. A product as set forth in claim 8 further comprising a recess defined between each successive tab of the plurality of tabs, the recesses separating each successive tab.

12. A product as set forth in claim 8 wherein each of the plurality of tabs is a unitary extension of a body of the outer panel.

13. A product as set forth in claim 9 further comprising a hem line located on each of the plurality of tabs, about which each of the plurality of tabs are folded during the hemming process.

14. A product as set forth in claim 13 further comprising a heat region located adjacent each hem line such that each hem line is heated to an elevated temperature as compared to other portions of each of the plurality of tabs and as compared to other portions of the flange, each hem line being heated before each of the plurality of tabs is folded during the hemming process.

15. A method of making a product, the method comprising:
providing an inner panel and an outer panel of an automotive closure panel assembly, the outer panel being composed of magnesium or a magnesium alloy, the outer panel having a flange protruding from a body of the outer panel, the outer panel also having a plurality of tabs spaced along the flange and extending away from the flange;
folding each of the plurality of tabs over the inner panel; and
heating a hem line that is located on each of the plurality of tabs before the folding of each of the plurality of tabs.

16. A method as set forth in claim 15 wherein folding further comprises only folding each of the plurality of tabs, whereby the flange remains unfolded.

17. A method of making a product, the method comprising:
providing an inner panel and an outer panel of an automotive closure panel assembly, the outer panel being composed of magnesium or a magnesium alloy, the outer panel having a plurality of tabs extending away from a body of the outer panel;
folding each of the plurality of tabs over the inner panel; and
heating a hem line that is located on each of the plurality of tabs before the folding of each of the plurality of tabs.

* * * * *